No. 844,157. PATENTED FEB. 12, 1907.
L. R. LOUGHBOROUGH.
DRAFTING INSTRUMENT.
APPLICATION FILED FEB. 20, 1905.
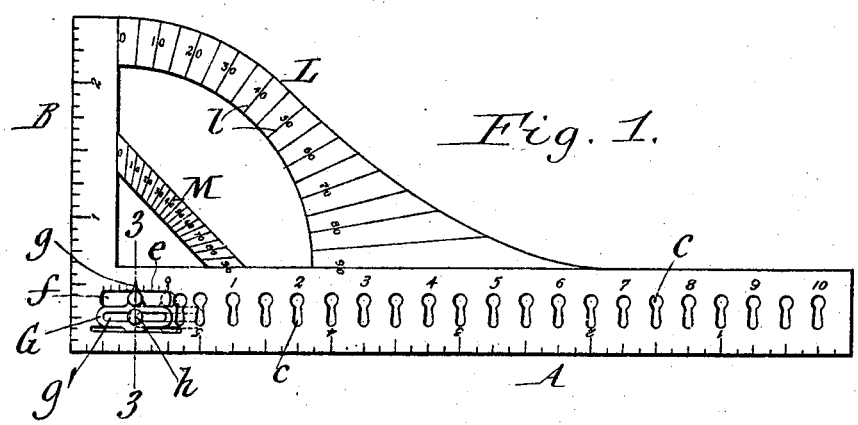
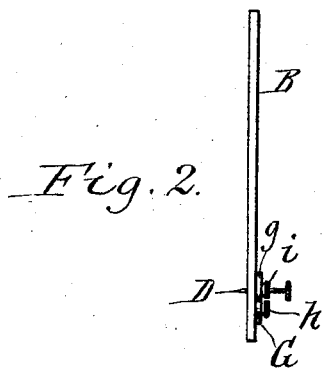
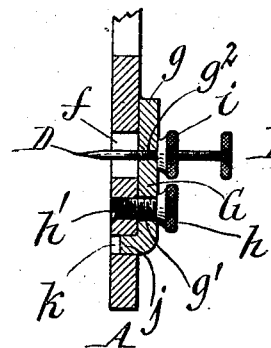
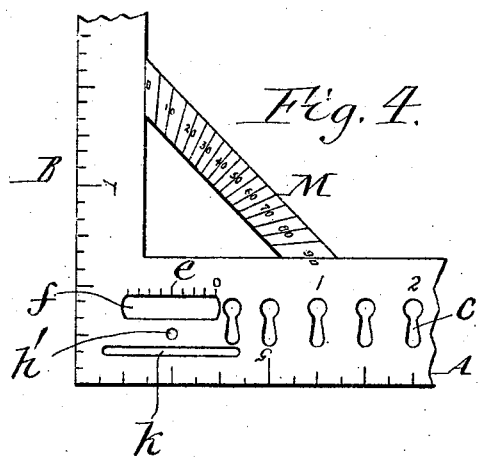
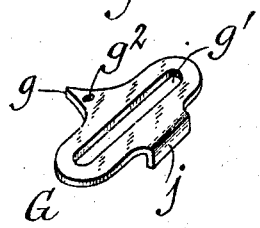
Witnesses:
Robert Weitknecht
Louis W. Gratz
Leroy R. Loughborough
Inventor
by Geyer & Popp
Attorneys
THE NORRIS PETERS CO., WASHINGTON, D. C.

UNITED STATES PATENT OFFICE.

LEROY R. LOUGHBOROUGH, OF ROCHESTER, NEW YORK.

DRAFTING INSTRUMENT.

No. 844,157.  Specification of Letters Patent.  Patented Feb. 12, 1907.

Application filed February 20, 1905. Serial No. 246,396.

*To all whom it may concern:*

Be it known that I, LEROY R. LOUGHBOROUGH, a citizen of the United States, residing at Rochester, in the county of Monroe and State of New York, have invented new and useful Improvements in Drafting Instruments, of which the following is a specification.

This invention relates to an improved instrument suitable for use by draftsmen, mechanics, and students of drawing, geometry, and similar subjects requiring the use of a compass, a square, and a protractor.

The object of my invention is the provision of a compact, accurate, and inexpensive instrument which combines the advantages of a compass, ruler, and square, and also, preferably, an angle-indicator.

In the accompanying drawings, Figure 1 is a plan view of the instrument. Fig. 2 is an edge view of its wide end. Fig. 3 is an enlarged cross-section thereof in line 3 3, Fig. 1. Fig. 4 is a fragmentary plan view of the instrument, on an enlarged scale, with the center-pin and its adjustable carrier removed. Fig. 5 is a perspective view of the carrier.

Similar letters of reference indicate corresponding parts throughout the several views.

A indicates a ruler forming the main member of the instrument, and B a bar extending at right angles to one end of the ruler and forming a square therewith. These members are made of suitable length and both having the customary graduation marks or lines along their edges, preferably down to one-eighth of an inch, as shown.

The main member A is provided with a longitudinal series of holes $c$, adapted to receive a pencil-point in using the instrument as a compass for inscribing arcs or circles. The holes are preferably spaced uniformly and arranged to coincide with some or all of the graduations of said member, say the inch, half-inch, and quarter-inch marks, as illustrated in the drawings. These holes may be circular or of other suitable shape; but they are preferably in the form of transverse slots or keyholes, as shown, the pencil-point being inserted in the round portion of the slot. By this construction the paper or other object upon which a circle is to be inscribed is plainly visible through the slots for some distance in advance of the pencil-point.

At or near the corner of the square the instrument is provided with a prick-point or center-pin D, upon which it is adapted to be swung in using the device as a compass. Preferably this pin is adjustable lengthwise of the main member or scale A and combined with an auxiliary scale $e$, divided into finer graduations than the main scale on said member—say sixteenths of an inch—so that if, for example, it should be desired to inscribe a circle having a radius equal to a given number of inches and a fraction of an inch less than the smallest graduations of the main scale this can be done by shifting the center pin opposite the corresponding graduation of the auxiliary scale. In the preferred construction shown in the drawings the centering-pin consists of a pointed screw passing through a longitudinal slot $f$ in the main member A and carried by a plate G, provided centrally at its front edge with a pointer $g$, which traverses the auxiliary scale $e$, extending along the adjacent edge of said slot. This plate or carrier has a longitudinal slot $g'$ for the passage of a set-screw $h$, which clamps the plate against the face of the member A and engages with a threaded opening $h'$ formed therein. The pointer $g$ has a screw-threaded hole $g^2$, which receives the centering-pin, and the latter is reliably held in place by a lock-nut $i$. To prevent accidental turning or twisting of the plate G, the same is provided at its rear edge with a downwardly-extending lip or guide $j$, which enters a longitudinal slot $k$, formed in the member A.

The keyhole $c$ at the left-hand end of the series is preferably placed closely to the graduated slot $f$ to permit the inscription of comparatively small circles. The first or extreme right-hand graduation of said slot may be marked zero, as shown, and when the keyholes are arranged in line with the inch, half-inch, and quarter-inch graduations of the ruler alternate holes are numbered "1, 2, 3," &c., beginning with the third hole from the left-hand end of the series, as best illustrated in Fig. 1. By this arrangement upon adjusting the carrier G with its pointer at zero and inserting a pencil-point, for example, in the keyhole marked "1" the diameter of the inscribed circle will be one inch, while by inserting it in the keyhole marked "2" the diameter of the circle will be two inches, and so on. If it is desired to inscribe a circle with a diameter of one or more inches plus a fraction of an inch smaller than the distance between successive keyholes, the carrier G is shifted toward the left as required. By this construction and arrangement the diameter may be ascertained at a glance.

While I prefer to graduate the keyholes and the auxiliary scale e as shown in the drawings, the same may obviously be widely varied without departing from the scope of the invention.

L indicates a quadrant connecting the outer end of the angle-bar B with the main member A and bearing suitable degree marks or graduations l, which converge at the vertex of the angle formed by the inner edges of the main member A and the bar B. This quadrant serves not only as a protractor for laying out angles, but is specially useful as an indicator for determining angles already drawn. In using the instrument for the last-mentioned purpose the inner edge of the bar B is brought in line with one side of the angle to be ascertained, and the degree of the angle is then read off on the quadrant where its other side intersects the latter.

A supplemental angle-indicator or scale M preferably extends diagonally from the bar B to the main member A on the inner side of the main angle-indicator L. This supplemental indicator is graduated like the main indicator L and is useful for determining the degree of comparatively small angles.

This improved instrument while serving as a ruler, square, and angle-indicator has a large range as a compass. By thus combining these various devices in a single instrument it is very convenient in use and saves the cost of a set of separate drawing tools or instruments, thus rendering the instrument especially desirable for students.

I claim as my invention—

1. An instrument of the character described, comprising a ruler provided with a longitudinal series of holes adapted to receive a marking-point and near one of its ends with a longitudinal slot, a slotted plate arranged adjacent to said slot, a set-screw for said plate passing through its slot and engaging the ruler, and a pin or center carried by the plate and passing through the slot of the ruler, substantially as set forth.

2. An instrument of the character described, comprising a ruler provided with a longitudinal series of holes adapted to receive a marking-point and near one of its ends with a pair of longitudinal slots, a slotted plate having a guide arranged in one of said slots and a pointer extending across the other slot, a set-screw passing through the slot of the plate into the ruler, and a pin or center carried by the plate and passing through the slot bridged by said pointer, substantially as set forth.

3. An instrument of the character described, comprising a ruler provided with a main scale or series of graduations, a longitudinal series of holes coinciding with graduations of said scale, an auxiliary scale arranged at one end of said main scale and having smaller graduations than the same, and a pin or center adjustably mounted on the ruler opposite said auxiliary scale, substantially as set forth.

4. An instrument of the character described, comprising a ruler provided with a main scale or series of graduations, a longitudinal series of holes coinciding with graduations of said scale, and a longitudinal slot arranged at one end of the series of holes and provided along its edge with an auxiliary scale having smaller graduations than said main scale, a plate adjustably secured to the ruler adjacent to said slot and having a pointer coöperating with the auxiliary scale, and a pin or center carried by said plate and passing through said slot, substantially as set forth.

Witness my hand this 9th day of February, 1905.

LEROY R. LOUGHBOROUGH.

Witnesses:
G. B. LOUGHBOROUGH,
C. H. VAN NEST.